(12) United States Patent
Cunningham et al.

(10) Patent No.: US 10,409,294 B2
(45) Date of Patent: Sep. 10, 2019

(54) FIELD SERVICE DEVICE AND METHOD FOR FACILITATING A PROCESSING SYSTEM REPLACEMENT IN A VIBRATORY FLOWMETER

(75) Inventors: Timothy J. Cunningham, Boulder, CO (US); David J. Kapolnek, Broomfield, CO (US)

(73) Assignee: Micro Motion, Inc., Boulder, CO (US)

( * ) Notice: Subject to any disclaimer, the term of this patent is extended or adjusted under 35 U.S.C. 154(b) by 569 days.

(21) Appl. No.: 14/366,388

(22) PCT Filed: Jan. 10, 2012

(86) PCT No.: PCT/US2012/020777
§ 371 (c)(1),
(2), (4) Date: Jun. 18, 2014

(87) PCT Pub. No.: WO2013/105933
PCT Pub. Date: Jul. 18, 2013

(65) Prior Publication Data
US 2014/0330439 A1    Nov. 6, 2014

(51) Int. Cl.
*G05D 7/06* (2006.01)
*G01F 25/00* (2006.01)
(Continued)

(52) U.S. Cl.
CPC ............. *G05D 7/0635* (2013.01); *G01F 1/84* (2013.01); *G01F 1/8468* (2013.01); *G01F 25/0007* (2013.01)

(58) Field of Classification Search
CPC .... G09G 2320/0285; G05B 2219/1176; H02P 6/06
(Continued)

(56) References Cited

U.S. PATENT DOCUMENTS 5,228,327 A    7/1993    Bruck
5,325,288 A *  6/1994    Satou ................. G05B 13/0245
                                                 700/42
(Continued)

FOREIGN PATENT DOCUMENTS

EP     1108992 A1    6/2001
RU     2119149 C1    9/1998
(Continued)

*Primary Examiner* — Brian W Wathen
*Assistant Examiner* — Brian T McMenemy
(74) *Attorney, Agent, or Firm* — The Ollila Law Group LLC

(57) ABSTRACT

A field service device (280) for facilitating a processing system replacement in a vibratory flowmeter is provided. The field service device (280) includes a field service device processor (282) configured to interface with one or more vibratory flowmeter processing systems and a storage system (285) configured to store pre-replacement operationally-derived values (252a), post-replacement operationally-derived values (252b), and one or more scaling factors (266). The field service device processor (282) is configured to obtain pre-replacement operationally-derived values (252a), obtain post-replacement operationally-derived values (252b) after an old processing system has been replaced with a replacement processing system, generate the one or more scaling factors (266) as a ratio of one or more pre-replacement operationally-derived values (252a) to one or more post-replacement operationally-derived values (252b), and download the one or more scaling factors (266).

18 Claims, 4 Drawing Sheets

(51) Int. Cl.
  *G01F 1/84* (2006.01)
  *G06F 9/06* (2006.01)
(58) Field of Classification Search
  USPC .................................................. 700/276–278
  See application file for complete search history.

(56) References Cited

U.S. PATENT DOCUMENTS

| | | | |
|---|---|---|---|
| 5,734,112 A | | 3/1998 | Bose |
| 7,827,844 B2 | | 11/2010 | Patten et al. |
| 7,865,318 B2 | | 1/2011 | Rensing et al. |
| 7,904,268 B2 | | 3/2011 | Wheeler et al. |
| 2004/0260405 A1* | 12/2004 | Eddie .................. G05B 19/0426 700/3 |
| 2006/0123915 A1 | | 6/2006 | Arnold et al. |
| 2006/0259197 A1* | 11/2006 | Boe ...................... G05B 13/027 700/246 |
| 2007/0193334 A1* | 8/2007 | Hays ..................... G01F 1/8436 73/1.34 |
| 2007/0255520 A1* | 11/2007 | Becker ................. G05B 19/042 702/127 |
| 2009/0157925 A1* | 6/2009 | Schwalbe ............ G05B 19/042 710/105 |
| 2009/0228611 A1* | 9/2009 | Ferguson .................. G06F 8/60 710/8 |
| 2011/0178738 A1 | | 7/2011 | Rensing et al. |

FOREIGN PATENT DOCUMENTS

| | | |
|---|---|---|
| RU | 2182696 C2 | 5/2002 |
| WO | 2004034037 A1 | 4/2004 |
| WO | 2006099342 A1 | 9/2006 |

* cited by examiner

FIELD SERVICE DEVICE AND METHOD FOR FACILITATING A PROCESSING SYSTEM REPLACEMENT IN A VIBRATORY FLOWMETER

BACKGROUND OF THE INVENTION

1. Field of the Invention

The present invention relates to a field service device and method for a vibratory flowmeter, and more particularly, to a field service device and method for facilitating a processing system replacement in a vibratory flowmeter.

2. Statement of the Problem

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flowmeter includes one or more conduits that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation. The instrumentation receives signals from the two pickoff sensors and processes the signals in order to derive a mass flow rate measurement, among other things. Vibratory flowmeters, including Coriolis mass flowmeters and densitometers, therefore employ one or more flow tubes that are vibrated in order to measure a fluid.

During operation, the meter electronics of a vibratory flowmeter may acquire unique and useful data. The data may include configuration data that configures the vibratory flowmeter. The data may include calibration data that calibrates measurement values produced by the vibratory flowmeter. The data may include meter verification data that verifies proper operation of the vibratory flowmeter.

This data is important for proper operation of the flowmeter. This data may include data that reflects a current operational state of the vibratory flowmeter, wherein the data may include information regarding changes to the vibratory flowmeter over time. Changes in the vibrational characteristics may be due to use, corrosion, erosion, and/or other factors, for example. These changes to the flowmeter may be captured in the data.

A problem occurs when a processing system of the vibratory flowmeter needs to be replaced. The processing system may need to be replaced even where only partial failure has occurred. It should be understood that the failure may not necessarily affect a memory that stores this data.

Replacement of the processing system causes difficulties. Replacement of the processing system may result in post-replacement operational data, generated after installation of a replacement processing system, being scaled differently from the pre-replacement operational data due to gain differences through the electronics. Comparing the new operational data to the pre-replacement operational data may improperly indicate failures in the meter due to this scaling difference. As a result, the processing system replacement may be problematic and difficult.

Currently, if an enhanced core processor fails, the factory baseline must be reestablished by a field service person. The field service person must run the same algorithm as would be done in the factory in order to reestablish a new factory baseline. This process can be problematic due to customer timing, personnel availability, et cetera. A root cause for needing to reestablish the baseline with a new core is due to the fact that the electronics vary due to component tolerances. The component tolerances may be much greater than the necessary precision of the meter verification results.

ASPECTS OF THE INVENTION

In one aspect of the invention, a field service device for facilitating a processing system replacement in a vibratory flowmeter comprises:
  a field service device processor configured to interface with one or more vibratory flowmeter processing systems; and
  a storage system coupled to the field service device processor and configured to store pre-replacement operationally-derived values, post-replacement operationally-derived values, and one or more scaling factors;
  with the field service device processor being configured to obtain pre-replacement operationally-derived values of the vibratory flowmeter, obtain post-replacement operationally-derived values from the vibratory flowmeter after an old processing system has been replaced with a replacement processing system, generate the one or more scaling factors as a ratio of one or more pre-replacement operationally-derived values to one or more post-replacement operationally-derived values, and download the one or more scaling factors into one or more of the replacement processing system or a monitoring computer, wherein the one or more scaling factors can be used to process operationally-derived values.

Preferably, further comprising retaining the one or more scaling factors in the storage system of the field service device.

Preferably, the storage system further stores a data upload routine for uploading the pre-replacement operationally-derived values from the old processing system, a scaling factor routine for generating the one or more scaling factors, and a data download routine for downloading the one or more scaling factors into the replacement processing system.

Preferably, obtaining the pre-replacement operationally-derived values comprises obtaining the pre-replacement operationally-derived values from the old processing system.

Preferably, obtaining the pre-replacement operationally-derived values comprises obtaining the pre-replacement operationally-derived values from a manufacturer's facility.

Preferably, the one or more scaling factors are used to scale post-replacement operationally-derived values.

Preferably, the one or more scaling factors are used to scale pre-replacement operationally-derived values.

Preferably, the one or more scaling factors are used to scale vibratory flowmeter measurement values.

Preferably, the old processing system is replaced in the vibratory flowmeter by the replacement processing system before the scaling.

Preferably, the old processing system is replaced in the vibratory flowmeter by the replacement processing system after the scaling.

In one aspect of the invention, a processing system replacement method for a vibratory flowmeter comprises:
  obtaining pre-replacement operationally-derived values of the vibratory flowmeter;
  replacing the old processing system of the vibratory flowmeter with a replacement processing system;
  operating the vibratory flowmeter using the replacement processing system to generate post-replacement operationally-derived values;
  generating one or more scaling factors as a ratio of one or more pre-replacement operationally-derived values to one or more post-replacement operationally-derived values; and
  using the one or more scaling factors to process operationally-derived values.

Preferably, obtaining the pre-replacement operationally-derived values comprising obtaining the pre-replacement operationally-derived values from the old processing system.

Preferably, with obtaining the pre-replacement operationally-derived values comprising obtaining the pre-replacement operationally-derived values from a manufacturer's facility.

Preferably, with the one or more scaling factors being used to scale post-replacement operationally-derived values.

Preferably, with the one or more scaling factors being used to scale pre-replacement operationally-derived values.

Preferably, with the one or more scaling factors being used to scale vibratory flowmeter measurement values.

Preferably, wherein the old processing system is replaced in the vibratory flowmeter by the replacement processing system before the scaling.

Preferably, wherein the old processing system is replaced in the vibratory flowmeter by the replacement processing system after the scaling.

DESCRIPTION OF THE DRAWINGS

The same reference number represents the same element on all drawings. The drawings are not necessarily to scale.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
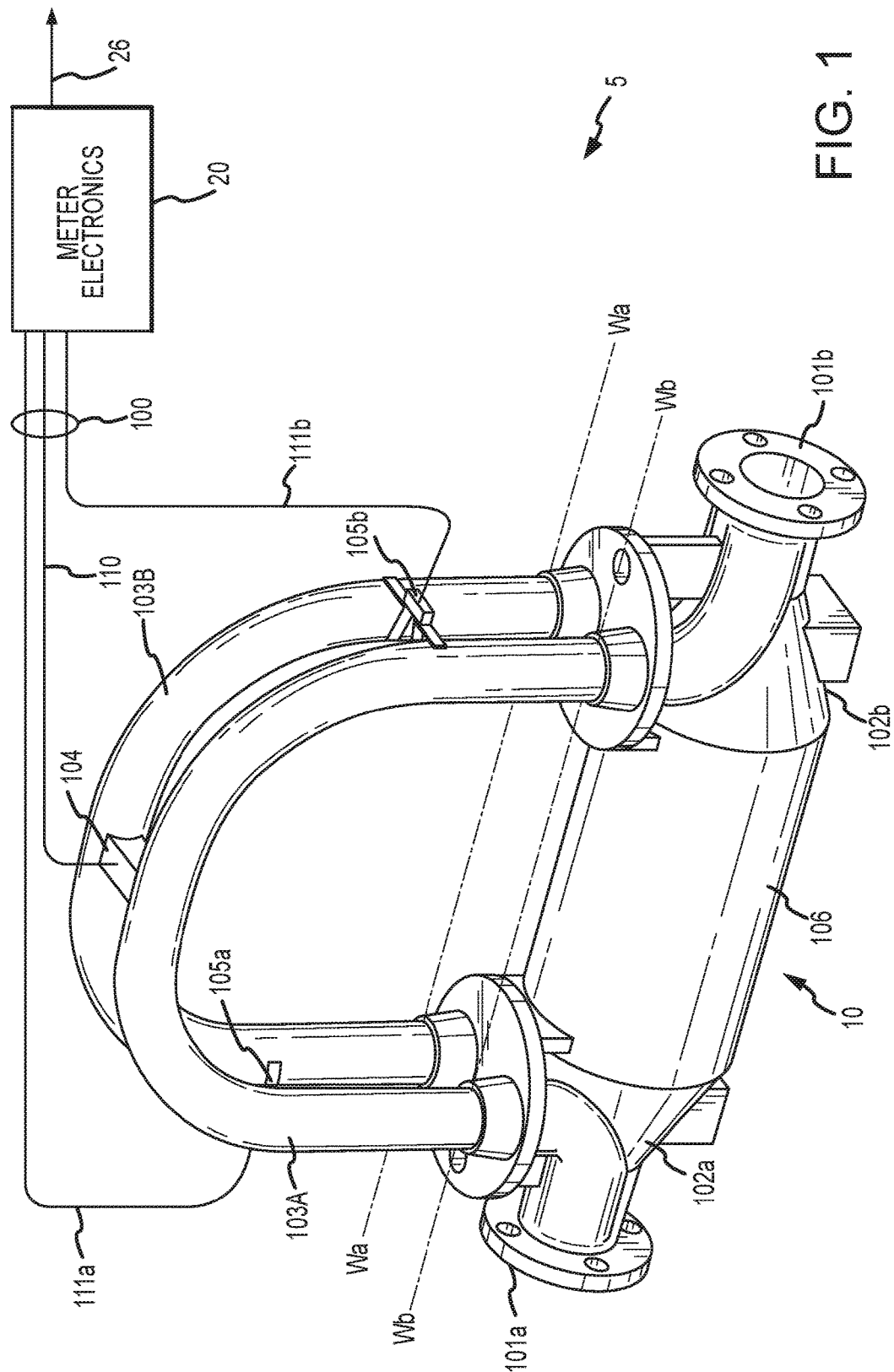
FIG. 1 shows a vibratory flowmeter according to the invention.

FIG. 1 shows a vibratory flowmeter 5 according to the invention. The vibratory flowmeter 5 comprises a flowmeter assembly 10 and meter electronics 20. The meter electronics 20 is connected to the meter assembly 10 via leads 100 and is configured to provide measurements of one or more of a density, mass flow rate, volume flow rate, totalized mass flow, temperature, or other measurements or information over a communication path 26. It should be apparent to those skilled in the art that the vibratory flowmeter 5 can comprise any manner of vibratory flowmeter, regardless of the number of drivers, pick-off sensors, flow conduits, or the operating mode of vibration. In some embodiments, the vibratory flowmeter 5 can comprise a Coriolis mass flowmeter. In addition, it should be recognized that the vibratory flowmeter 5 can alternatively comprise a vibratory densitometer.

The flowmeter assembly 10 includes a pair of flanges 101a and 101b, manifolds 102a and 102b, a driver 104, pick-off sensors 105a and 105b, and flow conduits 103A and 103B. The driver 104 and the pick-off sensors 105a and 105b are connected to the flow conduits 103A and 103B.

The flanges 101a and 101b are affixed to the manifolds 102a and 102b. The manifolds 102a and 102b can be affixed to opposite ends of a spacer 106 in some embodiments. The spacer 106 maintains the spacing between the manifolds 102a and 102b in order to prevent pipeline forces from being transmitted to flow conduits 103A and 103B. When the flowmeter assembly 10 is inserted into a pipeline (not shown) which carries the flow fluid being measured, the flow fluid enters the flowmeter assembly 10 through the flange 101a, passes through the inlet manifold 102a where the total amount of flow fluid is directed to enter the flow conduits 103A and 103B, flows through the flow conduits 103A and 103B and back into the outlet manifold 102b, where it exits the meter assembly 10 through the flange 101b.

The flow fluid can comprise a liquid. The flow fluid can comprise a gas. The flow fluid can comprise a multi-phase fluid, such as a liquid including entrained gases and/or entrained solids.

The flow conduits 103A and 103B are selected and appropriately mounted to the inlet manifold 102a and to the outlet manifold 102b so as to have substantially the same mass distribution, moments of inertia, and elastic modules about the bending axes Wa-Wa and Wb-Wb respectively. The flow conduits 103A and 103B extend outwardly from the manifolds 102a and 102b in an essentially parallel fashion.

The flow conduits 103A and 103B are driven by the driver 104 in opposite directions about the respective bending axes Wa and Wb and at what is termed the first out of phase bending mode of the vibratory flowmeter 5. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110. Other driver devices are contemplated and are within the scope of the description and claims.

The meter electronics 20 receives sensor signals on the leads 111a and 111b, respectively. The meter electronics 20 produces a drive signal on the lead 110 which causes the driver 104 to oscillate the flow conduits 103A and 103B. Other sensor devices are contemplated and are within the scope of the description and claims.

The meter electronics 20 processes the left and right velocity signals from the pick-off sensors 105a and 105b in order to compute a flow rate, among other things. The communication path 26 provides an input and an output means that allows the meter electronics 20 to interface with an operator or with other electronic systems. The description of FIG. 1 is provided merely as an example of the operation of a Coriolis flowmeter and is not intended to limit the teaching of the present invention.

The meter electronics 20 in one embodiment is configured to vibrate the flowtubes 103A and 103B. The vibration is performed by the driver 104. The meter electronics 20 further receives resulting vibrational signals from the pickoff sensors 105a and 105b. The vibrational signals comprise vibrational responses of the flowtubes 103A and 103B. The meter electronics 20 processes the vibrational responses and determines a response frequency and/or phase difference. The meter electronics 20 processes the vibrational response and determines one or more flow measurements, including a mass flow rate and/or density of the flow fluid. Other vibrational response characteristics and/or flow measurements are contemplated and are within the scope of the description and claims.

In one embodiment, the flowtubes 103A and 103B comprise substantially U-shaped flowtubes, as shown. Alternatively, in other embodiments, the flowtubes can comprise substantially straight flowtubes or can comprise one or more flowtubes of curved shapes other than U-shaped flowtubes. Additional flowmeter shapes and/or configurations can be used and are within the scope of the description and claims.

Figure 2:
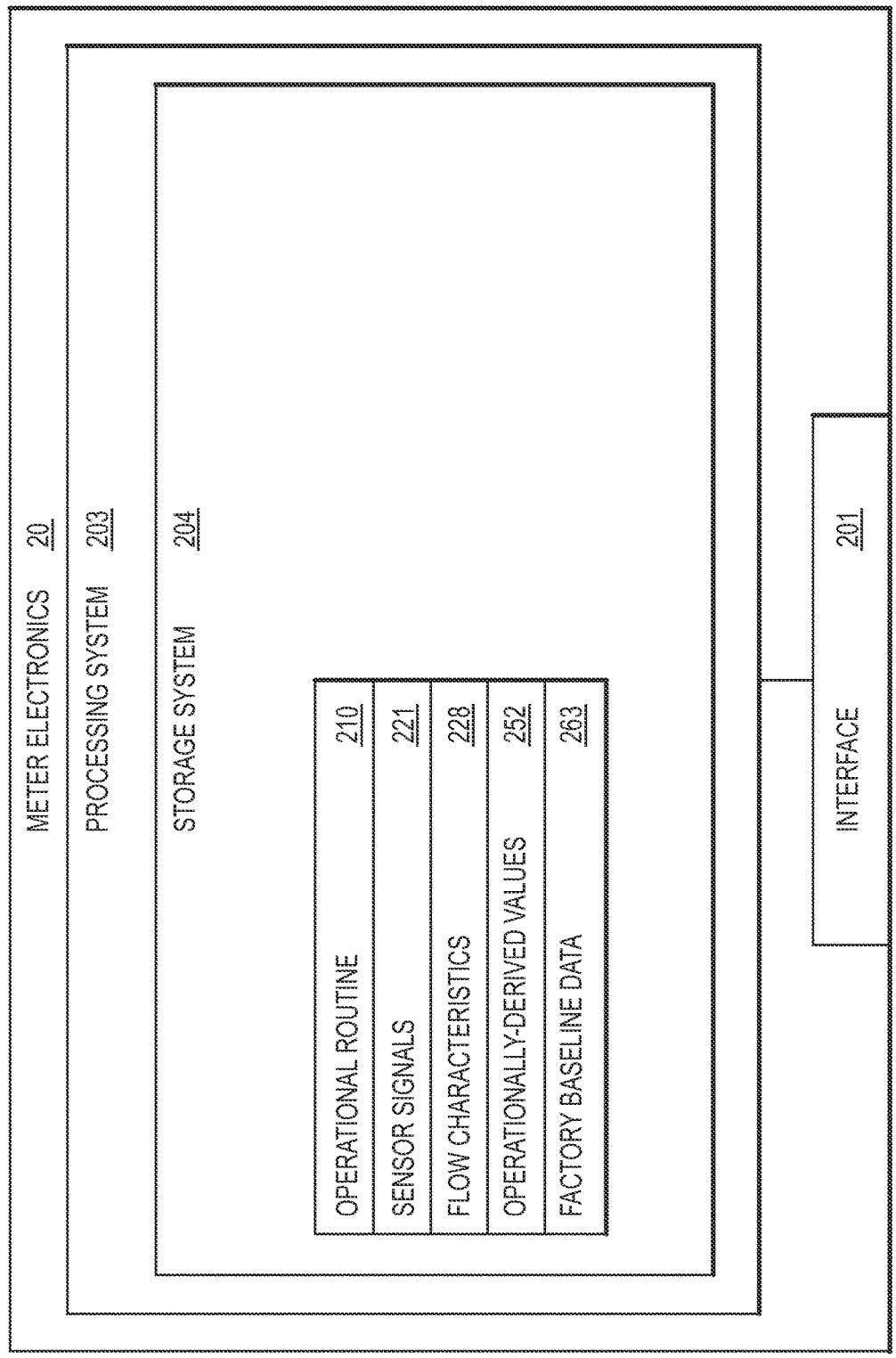
FIG. 2 shows meter electronics of the vibratory flowmeter according to an embodiment of the invention.

FIG. 2 shows meter electronics 20 of the vibratory flowmeter 5 according to an embodiment of the invention. The meter electronics 20 can include an interface 201 and a processing system 203. The meter electronics 20 receives one or more sensor signals 221 from the meter assembly 10, such as pickoff sensor signals from the pickoff sensors 105a and 105b. The meter electronics 20 processes the first and second sensor signals in order to obtain flow characteristics 228 of the flow material flowing through the meter assembly 10. For example, the meter electronics 20 can determine flow characteristics 228 including one or more of a phase difference, a frequency, a time difference ($\Delta t$), a density, a mass flow rate, and a volume flow rate from the sensor signals 221, for example. In addition, other flow characteristics 228 can be determined according to the invention.

The interface 201 receives the sensor signals from one of the velocity sensors 170L and 170R via the leads 100 of FIG. 1. The interface 201 can perform any necessary or desired signal conditioning, such as any manner of formatting, amplification, buffering, etc. Alternatively, some or all of the signal conditioning can be performed in the processing system 203.

In addition, the interface 201 can enable communications between the meter electronics 20 and external devices, such as through the communication path 26, for example. The interface 201 can be capable of any manner of electronic, optical, or wireless communication.

The interface 201 in one embodiment includes a digitizer (not shown), wherein the sensor signal comprises an analog sensor signal. The digitizer samples and digitizes the analog sensor signal and produces a digital sensor signal. The interface/digitizer can also perform any needed decimation, wherein the digital sensor signal is decimated in order to reduce the amount of signal processing needed and to reduce the processing time.

The processing system 203 conducts operations of the meter electronics 20 and processes flow measurements from the flow meter assembly 10. The processing system 203 executes one or more processing routines and thereby processes the flow measurements in order to produce one or more flow characteristics.

The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204.

In the embodiment shown, the processing system 203 determines the flow characteristics from one or more sensor signals 221. The processing system 203 can determine at least a phase difference and a frequency of the one or more sensor signals 221 and can determine a mass flow rate and a density from the phase difference and frequency, for example.

The storage system 204 can store flow meter parameters and data, software routines, constant values, and variable values. In one embodiment, the storage system 204 stores routines that are executed by the processing system 203. In one embodiment, the storage system 204 stores an operational routine 210. The operational routine 210, when executed by the processing system 203, can operate the vibratory flowmeter 5, including vibrating the flowmeter assembly 10, receiving one or more subsequent sensor signals 221, and generating one or more flow characteristics 228 from the one or more sensor signals 221. The operational routine 210 can also perform other operations, including communications operations and meter verification operations, for example. Other meter operations are contemplated and are within the scope of the description and claims.

In one embodiment, the storage system 204 stores variables used to operate the Coriolis flow meter 5. The storage system 204 can store one or more sensor signals 221 received from the pickoff sensors 105a and 105b. The storage system 204 can store one or more flow characteristics 228 derived from the one or more sensor signals 221. In addition, the storage system 204 can store a factory baseline data set 263 and can store operationally-derived values 252.

The factory baseline data set 263 may comprise multiple baseline values. The factory baseline data set 263 may comprise data that is programmed into the vibratory flowmeter 5 at the factory, or may be programmed into the vibratory flowmeter after the delivery and installation of the vibratory flowmeter 5.

The factory baseline data set 263 may include configuration values needed to configure the vibratory flowmeter 5. The configuration values may include information such as, for example, one or more flow material densities, one or more target vibration amplitudes, and one or more target vibration frequencies. Other configuration values are contemplated and are within the scope of the description and claims.

The factory baseline data set 263 may include calibration values needed in order to provide accurate and reliable flow measurement values from the raw measurement data. The calibration values may include a Flow Calibration Factor (FCF) that characterizes the meter's stiffness and geometry, for example. The calibration values may include a zero-flow time delay calibration value ($\Delta t_0$), comprising a time delay ($\Delta t$) between the pickoff sensors 105a and 105b when there is no flow through the flowtubes 103A and 103B. Other calibration values are contemplated and are within the scope of the description and claims.

The factory baseline data set 263 may include verification values used for verifying the operation of the vibratory flowmeter 5. The verification values may include density verification values, for example. Other verification values are contemplated and are within the scope of the description and claims.

The operationally-derived values 252 may comprise values derived during operation of the vibratory flowmeter 5. The operationally-derived values 252 may comprise factory baseline values of the factory baseline data set 263 that have been changed during operation of the vibratory flowmeter 5.

Figure 3:
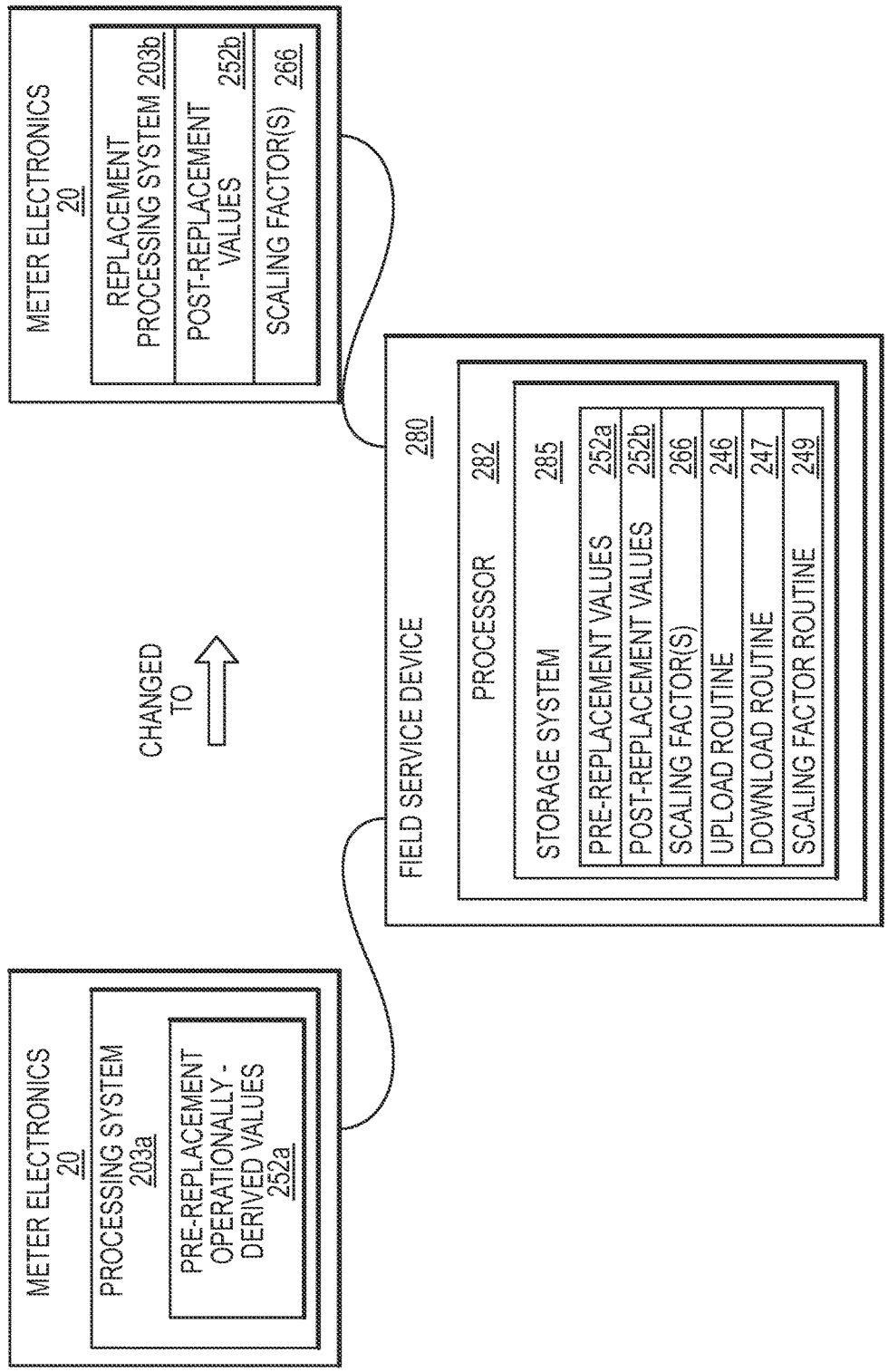
FIG. 3 shows a field service device in use to replace an old processing system of the meter electronics of the vibratory flowmeter according to an embodiment of the invention.

FIG. 3 shows a field service device 280 for facilitating a processing system replacement in the vibratory flowmeter 5 according to an embodiment of the invention. The field service device 280 comprises a processor 282 configured to interface with one or more vibratory flowmeter processing systems and a storage system 285 coupled to the processor 282. The field service device 280 may be used to configure the replacement processing system 203b. The field service device 280 may be used to configure the replacement processing system 203b to produce operationally-derived values that are not discontinuous from the operationally-derived values produced by the old processing system 203a.

In the figure, the meter electronics 20 on the left comprises "old" meter electronics 20, including an old processing system 203a. The old processing system 203a may store pre-replacement operationally-derived values 252a. The pre-replacement operationally-derived values 252a may comprise values derived during operation of the vibratory flowmeter 5, as previously discussed. The pre-replacement operationally-derived values 252a may comprise factory baseline values changed during operation of the vibratory flowmeter 5, as previously discussed (the old processing system 203a may store a factory baseline data set 263). The factory baseline data set 263 may comprise factory baseline data that is programmed into the vibratory flowmeter 5, as previously discussed. The factory baseline data set 263 may include configuration, calibration, and verification values, as previously discussed.

The meter electronics 20 on the right comprises the meter electronics 20 after replacement of the old processing system 203a with a replacement processing system 203b. The replacement processing system 203b may generate and store post-replacement operationally-derived values 252b. The post-replacement operationally-derived values 252b in some embodiments may comprise scaled operationally-derived values, as discussed below.

The field service device 280 may include a communication interface (not shown) coupled to the processor 282 and configured to communicate with the meter electronics 20. The field service device 280 may communicate with the meter electronics 20 via a wire connection, wirelessly, or using any suitable communication link, including electrical, magnetic, radio, acoustic, or optical communication systems.

The field service device 280 further includes a storage system 285 coupled to the processor 282. The storage system 285 is configured to store the pre-replacement operationally-derived values 252a, the post-replacement operationally-derived values 252b, and one or more scaling factors 266. Other values or information are contemplated and are within the scope of the description and claims.

The storage system 285 may store routines to be executed by the processor 282. The storage system 285 may store a data upload routine 246, a data download routine 247, and a scaling factor routine 249. Other routines are contemplated and are within the scope of the description and claims.

The data upload routine 246 may be used by the processor 282 to upload information from the meter electronics 20 into the storage system 285 of the field service device 280. The data upload routine 246 may be used to upload the operationally-derived values 252 of the old processing system 203. The data upload routine 246 may be used to upload the pre-replacement operationally-derived values 252a from the old processing system 203. The data upload routine 246 may be used to upload the post-replacement operationally-derived values 252b from the replacement processing system 203b. Alternatively, or in addition, the data upload routine 246 may upload data from other sources, such as a monitoring or data accumulating computer that is in communication with the vibratory flowmeter 5.

The data download routine 247 may be used by the processor 282 to download information from the storage system 285 of the field service device 280 into the meter electronics 20. The data download routine 247 may be used to download the one or more scaling factors 266 from the storage system 285 of the field service device 280 into the replacement processing system 203b, for example. Alternatively, or in addition, the data download routine 247 may download the one or more scaling factors 266 into other devices, such as a monitoring or data accumulating computer that is in communication with the vibratory flowmeter 5.

The scaling routine 249 may be used by the processor 282 to generate one or more scaling factors 266. The scaling routine 249 may generate the one or more scaling factors 266 from the pre-replacement operationally-derived values 252a and the post-replacement operationally-derived values 252b. The scaling routine 249 may generate the one or more scaling factors 266 as a ratio of the pre-replacement operationally-derived values 252a to the post-replacement operationally-derived values 252b. The scaling routine 249 may generate the one or more scaling factors 266 as a ratio of one or more pre-replacement operationally-derived values 252a to one or more post-replacement operationally-derived values 252b, wherein multiple scaling factors 266 may be created. Such multiple scaling factors 266 may be needed where different items in the operationally-derived values may need to be individually or differently scaled, such as where amplification factors are being applied.

The one or more scaling factors 266 may be used by the vibratory flowmeter 5 to scale vibratory flowmeter measurement values. The one or more scaling factors 266 may be used to scale meter configuration values. The one or more scaling factors 266 may be used to scale meter calibration values. The one or more scaling factors 266 may be used to scale meter verification values. Alternatively, or in addition, the one or more scaling factors 266 may be used by a monitoring or data accumulating computer that is in communication with the vibratory flowmeter 5.

The processor 282 is configured to obtain the pre-replacement operationally-derived values 252a of the vibratory flowmeter 5, obtain post-replacement operationally-derived values 252b from the replacement processing system 203b after the old processing system 203a has been replaced with the replacement processing system 203b, generate one or more scaling factors 266 as a ratio of one or more pre-replacement operationally-derived values 252a to one or more post-replacement operationally-derived values 252b, and download the one or more scaling factors 266 into the replacement processing system 203b and/or into another appropriate computer or computers, such as a monitoring or data accumulating computer that is in communication with the vibratory flowmeter 5. The one or more scaling factors 266 may be used by the replacement processing system 203b and/or other computers to scale operationally-derived values 252. Therefore, the replacement operating system 203b may operate substantially identically to the old processing system 203a.

The field service device 280 may be used to diagnose and/or repair a meter electronics 20 of a vibratory flowmeter 5. The field service device 280 may be configured to detect a problem with a processing system 203 of the vibratory flowmeter 5, including detecting or determining whether the processing system 203 needs to be replaced.

Figure 4:
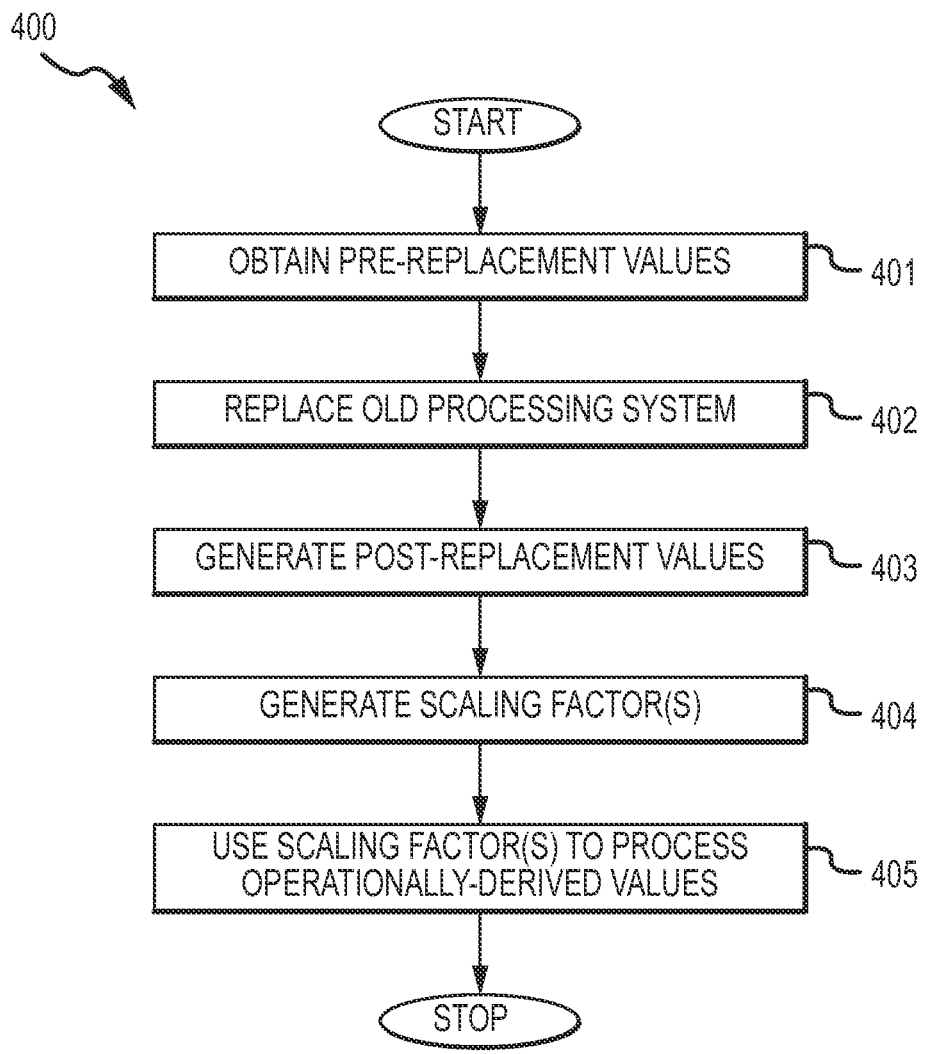
FIG. 4 is a flowchart of a processing system replacement method for a vibratory flowmeter according to an embodiment of the invention.

FIG. 4 is a flowchart 400 of a processing system replacement method for a vibratory flowmeter 5 according to an embodiment of the invention. In step 401, pre-replacement operationally-derived values 252a are uploaded into the field service device 280. The field service device 280 may be operated by a technician or repairman.

The pre-replacement operationally-derived values 252a may be uploaded from the old processing system 203a. Alternatively, the uploading may comprise uploading the pre-replacement operationally-derived values 252a from a device external to the vibratory flowmeter 5. The external device may comprise a local computer device that is in communication with one or more flowmeters and receives and collects data from the one or more flowmeters. The external device may comprise a factory server, database, or other factory storage. The pre-replacement operationally-derived values 252a may have been stored externally to the vibratory flowmeter 5 during a data backup procedure, for example. Consequently, the pre-replacement operationally-derived values 252a may be available even where the old processing system 203a has become completely non-functional.

The pre-replacement operationally-derived values 252a comprise values generated during operation of the vibratory flowmeter 5 with the old processing system 203a. The uploading of the pre-replacement operationally-derived values 252a may be done before replacement of the old processing system 203a.

The pre-replacement operationally-derived values 252a may include configuration values that have been programmed into the vibratory flowmeter 5. The configuration values may be unchanged or may have been modified during operation by the vibratory flowmeter 5.

The pre-replacement operationally-derived values 252a may include calibration values, such as a tube stiffness value and a residual tube flexibility value, for example. The calibration values may be unchanged or may have been modified during operation by the vibratory flowmeter 5. It should be understood that other calibration values are contemplated and are within the scope of the description and claims.

The pre-replacement operationally-derived values 252a may comprise a portion of a factory baseline data set 263 stored within the vibratory flowmeter 5 and that has been changed by field operation. The changes to the factory baseline data set 263 may occur over time, during field operation of the vibratory flowmeter 5.

The changes over time to the pre-replacement operationally-derived values 252a may be unique for a particular vibratory flowmeter 5. Consequently, it may be desirable for the pre-replacement operationally-derived values 252a to be carried over from the old processing system 203a into the replacement processing system 203b. The pre-replacement operationally-derived values 252a may enable the replacement processing system 203b to operate substantially identically to the old processing system 203a.

In step 402, the old processing system 203a of the vibratory flowmeter 5 is replaced with the replacement processing system 203b. The replacement step may include replacing a processor or processors within the meter electronics 20. The replacement step may include replacing one or more circuit boards of the meter electronics 20. The replacement step may include replacing chips, sub-boards, or circuits or components of the meter electronics 20.

In step 403, the vibratory flowmeter 5 is operated with the replacement processing system 203b installed, whereupon post-replacement operationally-derived values 252b are collected by the replacement processing system 203b. The post-replacement operationally-derived values 252b are preferably obtained with the original flow meter assembly 10. The post-replacement operationally-derived values 252b may be obtained using a new gain value or values due to the use of the replacement processing system 203b. The post-replacement operationally-derived values 252b may be discontinuous from the pre-replacement operationally-derived values 252a.

In step 404, one or more scaling factors 266 are generated. The one or more scaling factors 266 are generated from a comparison of the pre-replacement operationally-derived values 252a to the post-replacement operationally-derived values 252b. The one or more scaling factors 266 may be generated from a ratio of the pre-replacement operationally-derived values 252a (generated by the old processing system 203a) to the post-replacement operationally-derived values 252b (generated by the replacement processing system 203b), i.e., pre-replacement values/post-replacement values.

In step 405, the one or more scaling factors 266 are used to process operationally-derived values. The one or more scaling factors may be downloaded into the vibratory flowmeter 5 and/or may be downloaded into one or more appropriate monitoring or data accumulating computers that are in communication with the vibratory flowmeter 5. Consequently, the processing may be performed in the field service device 280 or may be performed in another device, such as a device external to and/or remove from the vibratory flowmeter 5.

In some embodiments, the one or more scaling factors 266 may be downloaded into and used by the replacement processing system 203b. The downloaded one or more scaling factors 266 may be stored in any appropriate storage in the replacement processing system 203b, including any manner of non-volatile memory, for example. The one or more scaling factors 266 may then be used by the replacement processing system 203b. The one or more scaling factors 266 may be used to scale post-replacement operationally-derived values subsequently produced by the vibratory flowmeter 5. As a result of the scaling, the post-replacement operationally-derived values may not exhibit a shift or discontinuity when compared to the pre-replacement operationally derived values.

Alternatively, the one or more scaling factors 266 may be used to scale the pre-replacement operationally-derived values instead of scaling subsequent operationally-derived values. This may require inverting the one or more scaling factors 266 or inverting the ratio or ratios used to generate the one or more scaling factors 266.

The one or more scaling factors 266 can be used to scale vibratory flowmeter measurement values. The one or more scaling factors 266 can be used to scale meter verification values. The one or more scaling factors 266 can be used to scale meter calibration values. The one or more scaling factors 266 can be used to scale meter configuration values.

The operationally-derived values can include user-available data that is desired to be retained in the vibratory flowmeter. The operationally-derived values can be user-accessible over a communication link and through meter-coupled devices, including diagnostic tools. The operationally-derived values can comprise data that is collected for possible future diagnostic use. Therefore, the operationally-derived values can comprise externally-available meter measurement data and/or internal data, including operational data and operational conditions. Furthermore, the operationally-derived values can include modal analysis data, with the modal analysis fitting measured data to a parametric model and analyzing the results.

The operationally-derived values can include amplifier calibration data. The amplifier calibration data can include amplifier calibration coefficients that can used to verify that the drive current amplifier of the vibratory flowmeter is essentially unchanged from factory values. The flowmeter may measure frequency response functions (FRFs) at one or more vibrational test tones. The obtained FRFs may be compared to stored amplifier calibration coefficients, where a deviation (or amount of deviation) may be used to infer a change or degradation in the vibratory flowmeter. The measured FRFs, and the amount of deviation may be stored as diagnostic or verification data.

The operationally-derived values can include filtering data. The filtering data may include stored filtering information such as filter response times, filter orders, the number and spacing of filter taps, decimation information, and stopband information, for example.

The operationally-derived values can include a flowtube/flowmeter residual flexibility data. The residual flexibility data may be computed from FRFs, wherein a residual flexibility matrix is derived from a residue matrix of a pole and residue processing. The residual flexibility may result from a mass imbalance or other structural anomaly in the flowtubes or flowmeter structure. The residual flexibility may be tracked over time, with any changes to the residual flexibility being used as a diagnostic to detect structural changes to the vibratory flowmeter.

The operationally-derived values can include a stiffness uncertainty data. The stiffness uncertainty data can comprise statistical data regarding a change in stiffness from a factory baseline. The stiffness uncertainty data may characterize the stiffness values versus a run number of the flowmeter.

The field service device and method according to the invention can be employed according to any of the embodiments in order to provide several advantages, if desired. The field service device and method can be employed to facilitate a processing system replacement in a vibratory flowmeter. The field service device and method can be employed to facilitate a processing system replacement in a vibratory flowmeter wherein post-replacement operationally-derived values do not differ or diverge from pre-replacement operationally-derived values.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

What is claimed is:

1. A field service device (280) for facilitating a processing system replacement in a vibratory flowmeter, with the field service device (280) comprising:
    a field service device processor (282) configured to interface with one or more vibratory flowmeter processing systems, the one or more vibratory flowmeter processing systems including an electronics; and
    a storage system (285) coupled to the field service device processor (282) and configured to store pre-replacement operationally-derived values (252*a*), post-replacement operationally-derived values (252*b*), and one or more scaling factors (266);
    with the field service device processor (282) being configured to obtain pre-replacement operationally-derived values (252*a*) of the vibratory flowmeter derived during operation of the vibratory flowmeter, obtain post-replacement operationally-derived values (252*b*) from the vibratory flowmeter after an old processing system has been replaced with a replacement processing system, generate the one or more scaling factors (266) as a ratio of one or more pre-replacement operationally-derived values (252*a*) to one or more post-replacement operationally-derived values (252*b*), and download the one or more scaling factors (266) into one or more of the replacement processing system (203*a*) or a monitoring computer, wherein the one or more scaling factors (266) corresponds to a gain difference through the electronics of the old processing system and the replacement processing system and can be used to process operationally-derived values (252);
    wherein the operationally-derived values (252) are at least one of meter calibration values and meter verification values.

2. The field service device (280) of claim 1, further comprising retaining the one or more scaling factors (266) in the storage system (285) of the field service device (280).

3. The field service device (280) of claim 1, with the storage system (285) further storing a data upload routine (246) for uploading the pre-replacement operationally-derived values (252*a*) from the old processing system, a scaling factor routine (249) for generating the one or more scaling factors (266), and a data download routine (247) for downloading the one or more scaling factors (266) into the replacement processing system (203*a*).

4. The field service device (280) of claim 1, with obtaining the pre-replacement operationally-derived values comprising obtaining the pre-replacement operationally-derived values from the old processing system.

5. The field service device (280) of claim 1, with obtaining the pre-replacement operationally-derived values comprising obtaining the pre-replacement operationally-derived values from a manufacturer's facility.

6. The field service device (280) of claim 1, with the one or more scaling factors (266) being used to scale post-replacement operationally-derived values.

7. The field service device (280) of claim 1, with the one or more scaling factors (266) being used to scale pre-replacement operationally-derived values.

8. The field service device (280) of claim 1, with the one or more scaling factors (266) being used to scale vibratory flowmeter measurement values.

9. The field service device (280) of claim 1, wherein the old processing system is replaced in the vibratory flowmeter by the replacement processing system before the scaling.

10. The field service device (280) of claim 1, wherein the old processing system is replaced in the vibratory flowmeter by the replacement processing system after the scaling.

11. A processing system replacement method for a vibratory flowmeter, the method comprising:
    obtaining pre-replacement operationally-derived values of the vibratory flowmeter derived during operation of the vibratory flowmeter;
    replacing the old processing system having an electronics of the vibratory flowmeter with a replacement processing system having an electronics;
    operating the vibratory flowmeter using the replacement processing system to generate post-replacement operationally-derived values;
    generating one or more scaling factors as a ratio of one or more pre-replacement operationally-derived values to one or more post-replacement operationally-derived values, wherein the one or more scaling factors corresponds to a gain difference through the electronics of the old processing system and the replacement processing system; and
    using the one or more scaling factors to process operationally-derived values;
    wherein the operationally-derived values are at least one of meter calibration values and meter verification values.

12. The method of claim 11, with obtaining the pre-replacement operationally-derived values comprising obtaining the pre-replacement operationally-derived values from the old processing system.

13. The method of claim 11, with obtaining the pre-replacement operationally-derived values comprising obtaining the pre-replacement operationally-derived values from a manufacturer's facility.

14. The method of claim 11, with the one or more scaling factors being used to scale post-replacement operationally-derived values.

15. The method of claim 11, with the one or more scaling factors being used to scale pre-replacement operationally-derived values.

16. The method of claim 11, with the one or more scaling factors being used to scale vibratory flowmeter measurement values.

17. The method of claim 11, wherein the old processing system is replaced in the vibratory flowmeter by the replacement processing system before the scaling.

18. The method of claim 11, wherein the old processing system is replaced in the vibratory flowmeter by the replacement processing system after the scaling.

* * * * *